Aug. 9, 1966  C. H. HANFLAND  3,265,109
SAFETY NUT

Filed Sept. 14, 1962  2 Sheets-Sheet 1

Inventor:
Curt Hermann Hanfland
by
*[signature]*

Aug. 9, 1966     C. H. HANFLAND     3,265,109

SAFETY NUT

Filed Sept. 14, 1962     2 Sheets-Sheet 2

Inventor:
Curt Hermann Hanfland by ved the drawing in detail and to FIG. 1 particular, FIG. 1 shows an ordinary standard nut of the hexagonal type with an annular groove or clearing 1 which is arranged outside the central plane of the nut. The said groove divides the nut 2 into the sections 2a and 2b. While these sections are of different size in FIG. 1, it is to be noted that they may be of the same size or the upper portion may be larger than the lower portion depending on the purpose for which the nut is to be used. The cylindrical portion 2c formed by the groove 1 repre-

United States Patent Office 3,265,109
Patented August 9, 1966

3,265,109
SAFETY NUT
Curt Hermann Hanfland, Laustrasse 62,
Stuttgart-Sonnenberg, Germany
Filed Sept. 14, 1962, Ser. No. 223,793
2 Claims. (Cl. 151—21)

The present invention relates to a safety nut with at least one slot arranged transverse to the axis of the nut, said slot according to a heretofore known suggestion being located at least partially in the body of the nut for producing a spring effect. According to a heretofore known design, the provision of the slot in the nut body proper yields a safety nut which on one hand assures a proper screw connection and on the other hand has a low height and in view of the fact that little material is required is rather inexpensive to manufacture. This arrangement furthermore brings about that the height of the heretofore required neck of the nut may be low or even be omitted altogether. In this way it is possible to cut the individual nuts which is considerably less expensive than the manufacture of nuts on automats.

It is an object of the present invention to create a safety nut which may in a simple and inexpensive manner be produced even from customary nuts.

It is also an object of this invention to provide a nut as set forth in the preceding paragraph, which will also have inherent thereto a preload.

These and other objects and advantages of the invention will appear more clearly from the following specification in connection with the accompanying drawing, in which.

Figure 4:
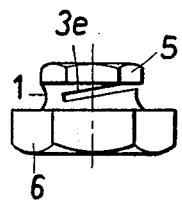
Figure 4A:
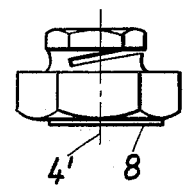
Figure 5:
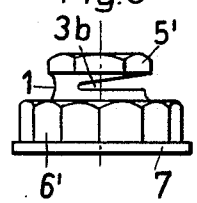

FIGS. 4, 4a and 5 respectively illustrate further embodiments of the invention according to which for reducing the weight of the nut the upper hexagon and lower hexagon are of different size.

Figure 6:
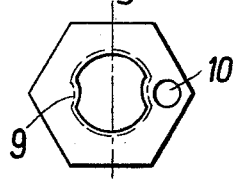

FIG. 6 shows a top view of a hexagonal nut in which the upper thread winding is pressed inwardly to a minor extent.

Figure 7:
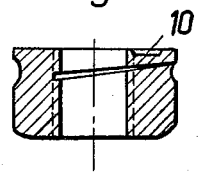

FIG. 7 shows a cross section through a nut in which the upper end of the slot has been compressed with regard to the lower end of the slot.

Figure 8:
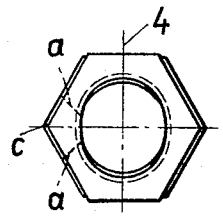

FIG. 8 illustrates the formation of a safety element while using a wedge spring as carrier.

Figure 9:
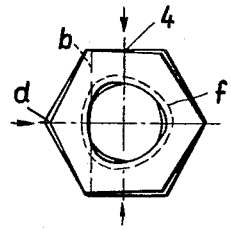

FIG. 9 shows a safety element similar to that of FIG. 8 but with triangular deformation of the safety carrier.

Figure 10:
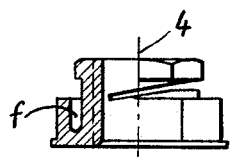

FIG. 10 shows the location of the slit of a smaller hexagon nut.

Figure 11:
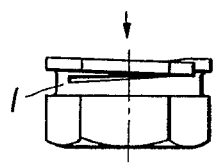

FIG. 11 shows a double slit.

Figure 12:
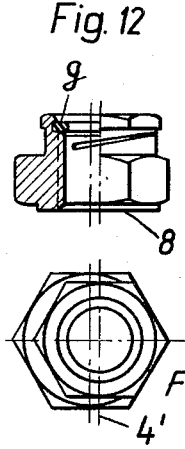
Figure 11A:
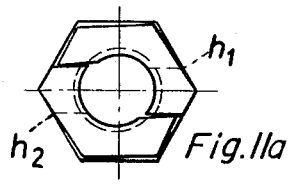
Figure 12A:
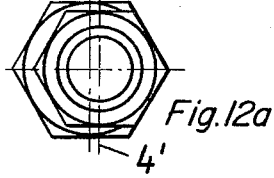

FIG. 12 shows a nut with axial displacement.

Figure 13:
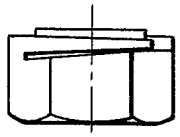
Figure 13A:
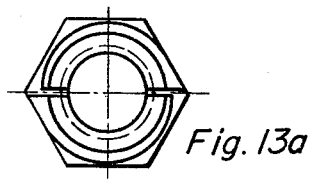

FIG. 13 shows a construction similar to that of FIG. 4 but with the safety carrier designed as a wedge spring of uniform strength in axial as well as in radial direction.

The nut according to the present invention is characterized primarily in that the slot is provided in a recess extending over the circumference of the nut body. This recess may consist of a narrow annular groove in the form of a clearing of low depth. It is advisable to arrange said clearing outside the center of the nut body and to provide the slot perpendicularly or at an incline to the axis of the nut within said clearing. In order to obtain as great a resiliency as possible of the two parts of the nut body separated by the clearing and the slot, according to a further feature of the invention, the slot may be provided so as to extend over half the circumference of the nut.

The arrangement of the slot in conformity with the present invention divides the nut so to speak into two sections which when tightening and screwing the nut will be distorted relative to each other in the manner of torsion members. A nut provided in the torsion section according to the invention with one or more straight or inclined cuts may without developing a preload be screwed onto the work piece by hand. The lower section may then be tightened by means of a wrench. Thereupon by means of a second wrench the upper section is tightened in opposite direction. In this way the torsion section will engage the bolt thread under tension and safeguard the nut against undesired loosening.

For purposes of providing low weight nuts, the invention may be so applied that an annular grove or clearing be provided between two different nuts, for instance a dodecagonal and a hexagonal nut. The upper hexagonal or dodecagonal nut portion may be smaller than the lower nut portion. If desired, the hexagonal nut portion may form the upper part and the dodecagonal nut portion may form the lower nut portion, for instance of a nut having a collar.

According to a further development of the invention, a plurality of slots, for instance two slots, may be provided which overlap each other with regard to the depth of the cut at least partially. If the slot is provided at an incline with regard to the annular groove or clearing and is located therein, the slot may be so wide that at least at one side it will extend beyond the groove or clearing into the body proper of the nut.

The invention is applicable to nuts adapted freely to be screwed onto a bolt and also to nuts to be screwed onto bolts under preload. A nut with preload may for instance be formed by providing a restraint by inserting a safety element in the upper portion of the nut body. This may be effected by one or a plurality of inclined straight slots, slots inclined at an angle to the thread pitch, etc. It is also possible so to design the upper portion of the nut that it will receive a ring of nylon or other material while an inclined slot is provided within the range of the upper nut portion so that in this way a double safety against loosening under shock or the like effects will be assured. In a similar way a double safety may be obtained by deforming the upper nut portion into an oval, square or hexagonal shape.

Figure 1:
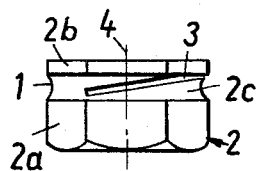
FIG. 1 represents a customary hexagonal nut provided with a slot in the neck of the nut.

Referring now to the drawing in detail and to FIG. 1 in particular, FIG. 1 shows an ordinary standard nut of the hexagonal type with an annular groove or clearing 1 which is arranged outside the central plane of the nut. The said groove divides the nut 2 into the sections 2a and 2b. While these sections are of different size in FIG. 1, it is to be noted that they may be of the same size or the upper portion may be larger than the lower portion depending on the purpose for which the nut is to be used. The cylindrical portion 2c formed by the groove 1 represents a torsion section in which, in conformity with the invention, there is provided a slot 3 which according to FIG. 1 forms an acute or obtuse angle with the nut axis 4 and in this way creates a wedge-spring. If desired, slot 3 may advantageously be extended beyond the axis 4 of the nut 2. In view of the fact that the nut has been subdivided into the two sections 2a and 2b by groove 1, it will be appreciated that when tightening the nut after it has been screwed for instance onto a bolt, one part may be distorted with regard to the other part.

Figure 2:
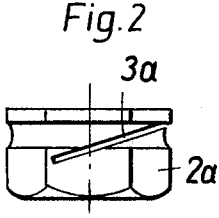
FIG. 2 illustrates a nut differing from that of FIG. 1 in that the slot according to the invention extends through the neck and into the nut body proper.
Figure 2A:
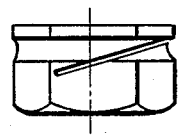
FIG. 2a shows the nut of FIG. 2 with the upper end of the slot somewhat compressed.

The embodiment of FIG. 2 differs from that of FIG. 1 in that the slot 3a extends downwardly beyond the groove 1 into the main body 2a of the nut. If slot 3a extends sufficiently far into the nut section 2a or in addition to the slot, a further slot is provided in section 2a or 2b of the nut and if the slot following the cutting of the thread into the nut is compressed, a freely screwable nut, for instance the nut of FIG. 1, may be transformed into a nut with preload so that with a nut with preload the safety element will be effective already when screwing the nut for instance onto a bolt. In contrast thereto, with a nut which is freely screwable, the safety element is effective at the same time with the power effect of the nut onto the work piece. According to the invention, it is thus possible, whenever necessary, to combine the advantage of one nut type with the advantage of the other nut type.

Figure 3:
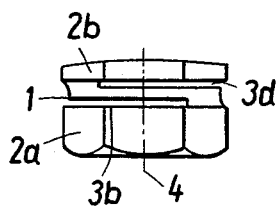
FIG. 3 represents a hexagonal nut with two slots arranged perpendicularly with regard to the axis of the nut.

As will be evident from FIG. 3, the nut body illustrated therein is likewise divided into two sections 2a and 2b by a groove 1. Slots 3b and 3d located within the range of groove 1 extend perpendicularly with regard to the axis 4 of the nut. As a result thereof, two flat springs are formed which may be made effective by a post-deformation as dish-springs. In order, in this instance, to obtain a double safety, the upper portion 2b of the nut is oval-shaped or is designed as a polygon.

According to the embodiment illustrated in FIGS. 4, 4a and 5, in order to obtain lightweight nuts, the upper hexagon 5 and lower hexagon 6 may be of different size. Slot 3e is provided within the groove 1 between the two different-sized flat hexagonal nut portions. The outer dimensions of the nut may, in spite of the same thread diameter, be made smaller. FIG. 4 shows a nut design according to which a further saving in weight may be obtained. To this end, the nut is designed eccentrically in such a way that the axis 4' is located outside the center of the two different hexagonal nut portions. In this way, two unevenly strong nut sections are obtained. One of the sections may be designed in conformity with the strength values to be met when tightening the screw, while the other section may be designed in conformity with the strength values required by the wedge effect. In order to obtain a uniform engagement of such eccentrically designed nut, the latter is provided with a central extension 8. With this design, the connection of the wedge spring to the lower nut body (power flow) will remain evenly strong. The nut according to FIG. 5 is somewhat similarly designed. The upper hexagonal portion 5' may be equipped with or without an additional safety element, whereas the lower dodecagonal forms the main nut body 6' proper. It may be provided with a collar 7. The slot 3b according to the invention is provided between the sections 5' and 6' in the groove 1 between said two nut sections. The slot 3b in FIG. 5 is so shaped as to confine an angle so that when tightening section 5' a larger path of rotation will be available, whereas with ordinary nuts, the surface is chamfered and is countersunk at the thread, as is illustrated in FIGS. 1 to 4. An essential advantage in connection with wedge-shaped, flat, and/or dish springs is seen in the fact that the surface is straight, as shown in FIGS. 1 and 2. As a result thereof, the spring cross-section becomes rectangular, more material is present, and thereby a better spring effect will be obtained. Inasmuch as flat nut surfaces are customary in practice and are only provided where the nut engages the work piece, it could happen that accidentally, a nut be screwed onto a bolt with the safety element at the lower end, so that the nut will not be effective as intended. In order to avoid such accidental misplacement of the nut, according to the present invention, the upper thread winding is at one or more portions (which may be so small that they correspond only to the size of the thread play) pressed inwardly as, for instance at 9, or the material, for instance at a corner of the hexagon is pressed outwardly by means of a punch. In this way, protrusions are produced which will make it impossible to screw the nut with the flat (FIGS. 1, 2) or rounded (FIG. 3) surface directed downwardly. According to the present invention, a stamp 10 may be provided which contains a company sign engraved or embossed. If the pressure during the stamping is sufficiently strong, approximately the upper third of the nut body may be compressed unilaterally (FIG. 7) and the thread axis of the nut may be bent to such an extent as to equal the play between the inner thread of the nut and the outer thread of the bolt. In this way, a safety element is obtained so that notches or the like will no longer be necessary.

FIGS. 8, 9, 11 and 13 show different types of deformation of one nut section relative to the other nut section in order to obtain an additional safety factor against accidental loosening of the nut. More specifically with regard to FIGS. 8 and 9, the nut body shown therein is also provided with a depression similar to the depression shown in the preceding figures. Furthermore, the said depression has an inclined slit therein which is indicated in dash-lines in FIGS. 8 and 9, the bottom of said slit being designated with the reference letters $a$ and $b$. According to FIGS. 8 and 9, the two nut sections separated from each other by the slit are respectively connected to each other at the areas $c$ and $d$. As will also be seen from FIGS. 8 and 9, the two nut sections separated from each other by the slit have been deformed with regard to each other by subjecting to pressure one of said sections by forces acting in the direction of the arrows shown in FIG. 9. The nut according to FIG. 10 shows a circumferential groove $f$ in the bottom nut section.

According to the nut shown in FIG. 11, the circumferential groove 1 has two slits arranged diametrically opposite to each other. The bottoms of the slits are respectively designated with the characters $h1$ and $h2$. The two nut sections are deformed relative to each other by upsetting in the direction parallel to the axis of the nut.

According to the arrangement of FIG. 12, the upper nut section has inserted therein a synthetic ring $g$ for exerting an additional locking effect. Also the axis of the nut is eccentrically located.

FIG. 13 also shows two slits offset with regard to each other.

It is, of course, to be understood, that the present invention is, by no means, limited to the particular constructions shown in the drawings but also comprises any modifications within the scope of the appended claims.

What I claim is:

1. A rotatable lock nut having a peripheral circumferential depression located on one side of that central plane of the nut which is transverse to the axis of rotation of the nut, the peripheral portions of the nut at both sides of said depression respectively being of different polygonal shape, said nut also being provided with at least one slit extending from a peripheral area of said nut beyond said axis and being located on the same side of said plane as said depression, at least one-half of the length of said slit extending within the area of said depression.

2. A rotatable lock nut having an eccentrically located threaded bore therethrough and having a peripheral circumferential depression located on one side of that central plane of the nut which is transverse to the longitudinal axis of said threaded bore, said nut also being provided with at least one slit extending from a peripheral area of said nut beyond said axis and being located on the same side of said plane as said depression, at least one-half of the length of said slit extending within the area of said depression.

References Cited by the Examiner

UNITED STATES PATENTS

| | | |
|---|---|---|
| 613,777 | 11/1898 | Putnam. |
| 1,263,217 | 4/1918 | Fine. |
| 2,221,961 | 11/1940 | Allen et al. |
| 2,235,405 | 3/1941 | Markey. |
| 2,301,634 | 11/1942 | Nicholay. |
| 2,367,259 | 1/1945 | Beach. |
| 2,390,662 | 12/1945 | Perry. |
| 2,519,417 | 8/1950 | Tripp. |
| 2,754,871 | 7/1956 | Stoll. |
| 2,968,821 | 1/1961 | Morin et al. _____ 151—7 |

FOREIGN PATENTS

| | | |
|---|---|---|
| 1,179,722 | 12/1958 | France. |
| 561,453 | 5/1944 | Great Britain. |

EDWARD C. ALLEN, *Primary Examiner.*

M. HENSON WOOD, JR., CARL W. TOMLIN, M. PARSONS, JR., *Assistant Examiners.*